(No Model.) 3 Sheets—Sheet 2.

A. B. PAUL.
APPARATUS FOR TREATING GOLD AND SILVER ORES.

No. 462,326. Patented Nov. 3, 1891.

WITNESSES
F. L. Durand
Chas. E. Riordon

INVENTOR
Almarin B. Paul,
By Arthur L. Morsell
his Attorney (No Model.) 3 Sheets—Sheet 3.
A. B. PAUL.
APPARATUS FOR TREATING GOLD AND SILVER ORES.
No. 462,326. Patented Nov. 3, 1891.
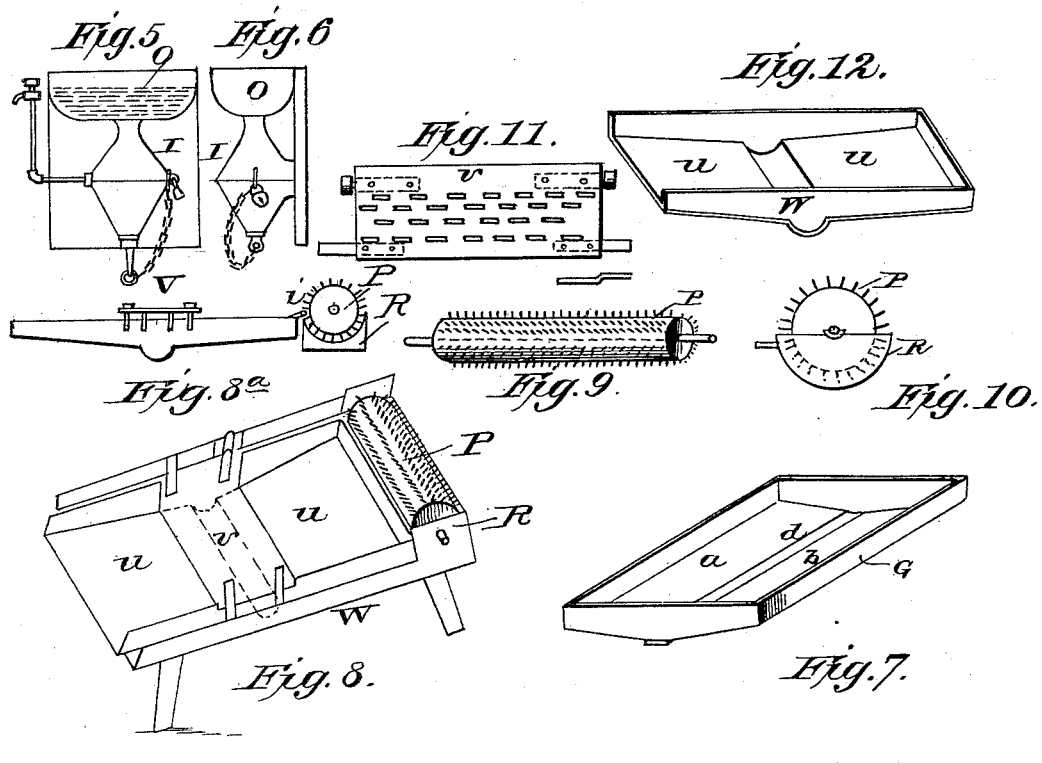
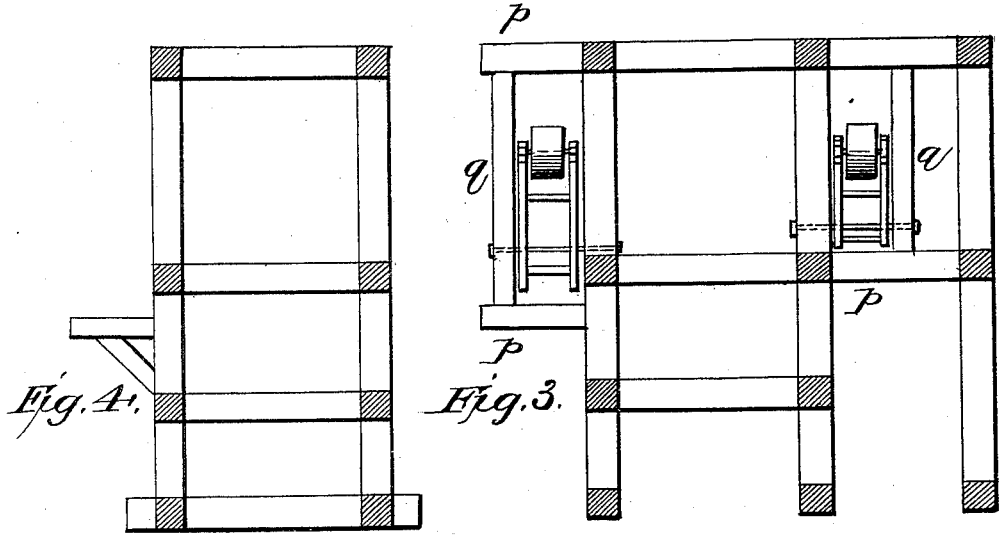
Witnesses.
F. L. Ourand.
Chas. C. Riordon.
Inventor.
Almarin B. Paul,
By Arthur L. Morsell
his Attorney.

United States Patent Office.

ALMARIN B. PAUL, OF SAN FRANCISCO, CALIFORNIA.

APPARATUS FOR TREATING GOLD AND SILVER ORES.

SPECIFICATION forming part of Letters Patent No. 462,326, dated November 3, 1891.

Application filed May 12, 1890. Serial No. 351,543. (No model.)

*To all whom it may concern:*

Be it known that I, ALMARIN B. PAUL, a citizen of the United States, residing at San Francisco, in the county of San Francisco and State of California, have invented certain new and useful Improvements in Apparatus for Treating Gold and Silver Ores by the Dry Process; and I do hereby declare the following to be a full, clear, and exact description of said invention, such as will enable others skilled in the art to which it most nearly appertains to make, use, and practice the same.

This invention relates to an improved process and apparatus for treating ores of the precious metals by a continuous and automatically-conducted operation, whereby the ore is reduced to the proper degree of fineness and subjected to such treatment that the gold or silver contained in it is separated and recovered from the base and worthless portions.

The foundation of the invention embodied in this application will be found in the several patents heretofore issued to myself and others as follows: Letters Patent No. 95,931, issued to myself and J. L. Wood October 19, 1869; Letters Patent No. 173,492, issued to me February 15, 1876, and Letters Patent No. 285,508, issued to me September 25, 1883; and the improvements herein embodied have been developed by actual experience and found to be important and necessary to the more efficient, proper, and economical carrying out of the process.

The main feature of the invention, as will be apparent from an inspection of the patents above referred to, is the dry treatment of the ores, whereby the separation and recovery of the gold or silver from the ore is accomplished without the use of water.

In the former patents parts described and claimed were separate and detached and not organized into a complete working apparatus. I have, however, in this application so organized and combined the several operations that I produce a continuous working process and apparatus for the dry and economical working of such ores.

Figure 1:
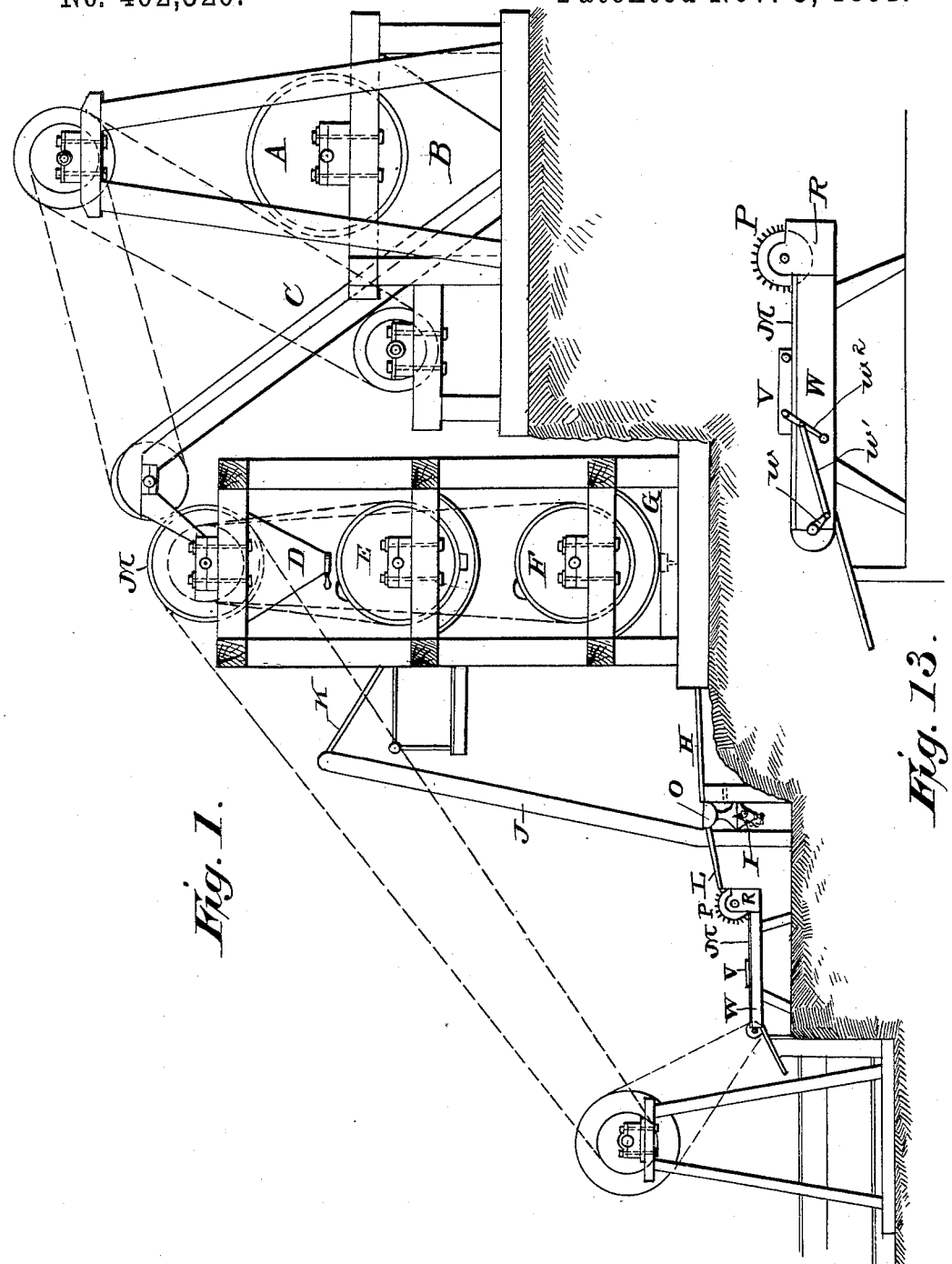
Figure 2:
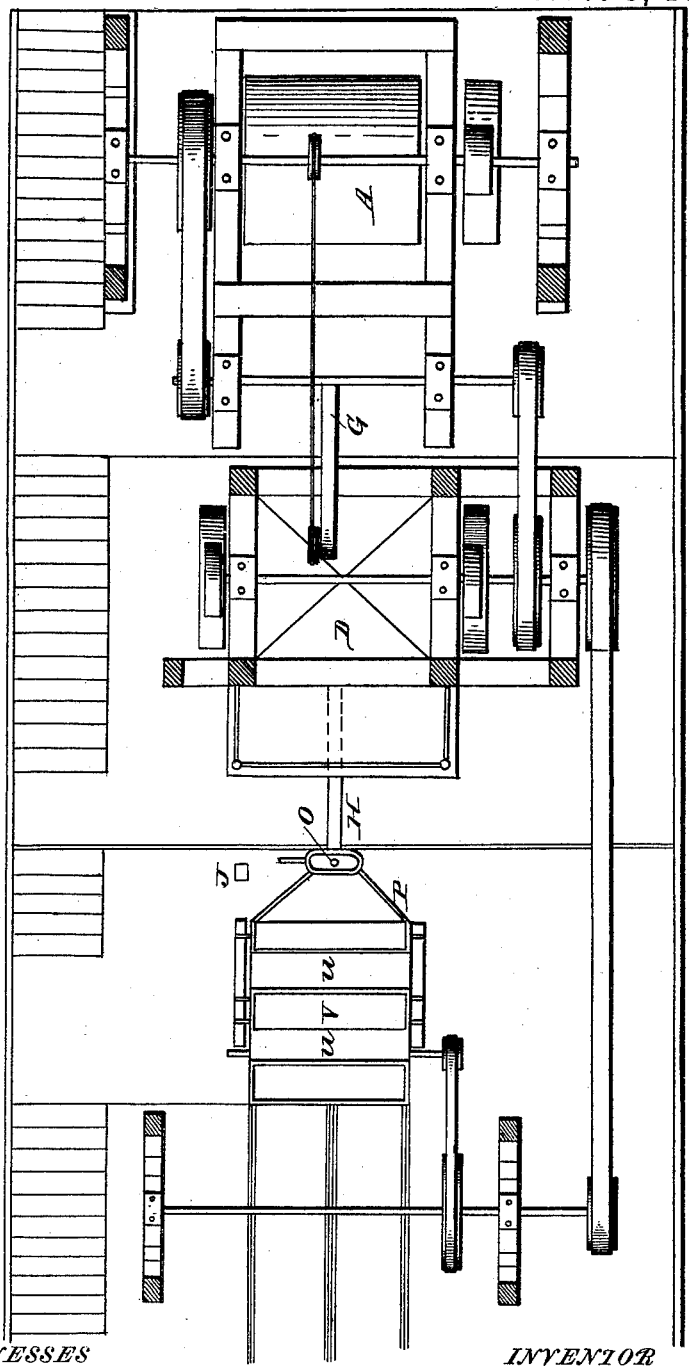

Referring to the accompanying drawings, Figure 1, Sheet 1, shows the several parts of my apparatus connected so as to operate continuously and automatically. Fig. 2, Sheet 2, is a plan view of same. Fig. 3, Sheet 3, is a front view of the frame-work in which the amalgamating-barrels are mounted. Fig. 4, Sheet 3, is an end view of same. Fig. 5, Sheet 3, is a front view of my improved amalgam-safe. Fig. 6, Sheet 3, is a side view of same. Fig. 7, Sheet 3, is a perspective view of the receiving-tank into which the contents of the lower settling-barrel are emptied. Fig. 8, Sheet 3, is a perspective view of what is hereinafter termed the "pin-agitator-roll trough." Fig. 8ª is a side elevation of the same. Figs. 9 and 10, Sheet 3, shows the pin-agitator roll. Fig. 11, Sheet 3, is a plan view of the toothed cover of the trough, Fig. 8. Fig. 12 illustrates in perspective the bottom of said trough; and Fig. 13 is a side elevation of trough W, illustrating the means for shaking the toothed plate.

The apparatus, as represented in Fig. 1, is located on terraces or benches for convenience in delivering the ore-pulp from one part of the apparatus to the other; but where this is not convenient the entire apparatus can be located on a single plane and elevators such as any mechanic can readily devise be employed for transferring and delivering the pulp from one part to the other.

This apparatus is intended more particularly to be used for carrying out a new process of treating gold and silver ore, for which I shall hereafter make application for Letters Patent, wherein the ore is subjected to a heating process before it enters the pulverizing-barrel, the temperature being sufficient to cause the ore after being pulverized and after being deposited in the amalgamating-barrel to retain a sufficient amount of heat to cause ready amalgamation, as described in the Letters Patent No. 285,508, issued to me September 25, 1883.

Let A represent the pulverizer. I prefer to use a barrel-pulverizer; but any of the well-known styles of ore-pulverizers can be used. The barrel-pulverizer which I have represented is mounted over a hopper B, into which the pulverized ore falls as fast as it is reduced to the required degree of fineness.

C is an elevator by means of which this finely-pulverized ore is taken from the hopper as fast as it accumulates and raised to the top of the frame-work in which the amalgamating-barrel is mounted. A hopper D is mounted at the upper end of this frame-work, and into this hopper the finely-pulverized ore is delivered by the elevator C, as shown.

E represents the amalgamating-barrel, into which the ore is dumped from the hopper D by charges and treated with mercury, it previously having been submitted to a drying process, as above described, and F is the settling-barrel immediately below it, into which the amalgamated ore is transferred and treated for the consolidating of all the mercury and precious metals which it now contains, as described in my former patent, above referred to. It is not necessary to describe the operation of these barrels here, as it is fully described in the patent referred to.

Underneath the settling-barrel F, I place an iron tank G, into which the pulp is dumped from the settling-barrel. This tank is shown at Fig. 7, Sheet 3. Its bottom is formed of two portions $a$ $b$, which incline toward the mid-line of the pan or tank, and both of these portions also incline toward the discharge end, thus giving the floor three lines of inclination. A gutter or channel $d$ runs through the middle line of the tank toward which the two portions of the floor slant or incline, as stated, so that the pulp when dumped into the tank will flow through the gutter and be conducted by a narrow trough H to the receiving-bowl O and amalgam-safe I shown at Figs. 5 and 6, Sheet 3.

The safe or trap above referred to forms the subject of Letters Patent No. 173,492, heretofore referred to, but is somewhat improved in its form, as hereinafter shown.

On completion of work of the settling operation in the barrel F a valve is opened, which allows the aggregated mercury to discharge, which it does in a solid column, carrying the amalgamated metals along with it to the receiving-bowl, where the gold deposits itself in the locked safe, while the mercury, freed of the amalgam, passes on and is automatically carried by the elevator J to the amalgamating-barrel for reuse. The ore as discharged also passes to the receiving-bowl, where any loose globule of mercury is deposited, the material moving on into a combined agitator and vibrator, the former being so arranged as to displace and deposit any small particles of mercury that might be attached to the sulphurets. The agitator is also used for spreading out the material to better equalize the density of water and sands for passing over the silver-plated vibrator, which still more thoroughly cleans the material of any loose quicksilver. It is also used as a guard against any careless working in the previous operations of an apparatus. The residue now being tailings containing sulphurets, the next operation is concentration of the sulphurets by any of the known concentrators. The mercury which overflows from the safe is taken up by an elevator J and carried to a spout or tube K, which returns it to the amalgamating-barrel for future use, while the gangue of the pulp which flows from the bowl of the amalgam-safe is conducted by a spout or trough L, the floor of which is an amalgamated surface, to the pin-wheel and shaking agitator, (shown at M.)

The agitator consists of a cylinder P, the surface of which is studded with projecting pins $i$, and it is mounted and rotated in a shallow semicircular trough R, into which the pulp is delivered. It is placed in position under the end of trough L, so that the tailings which flow from the bowl O are delivered into the semicircular trough, in which the toothed cylinder is rotated, as represented at Figs. 1 and 2. In passing under this toothed roller the sands are loosened up and intermixed by the teeth of the roller, so that the particles are separated, permitting any particles of amalgam or quicksilver that may have escaped the separator to settle to the bottom. After leaving the semicircular trough the tailings flow over inclined amalgamated plates $u$ $u$, which form the bottom of a trough W, (shown at Figs. 12 and 8,) and are therein subjected to an active stirring by means of a vibrating toothed plate. (Shown at Fig. 11 and marked V on Fig. 8ᵃ.) This toothed plate is mounted across the transversely-recessed middle portion of the trough W and has teeth extending down into the trough, which stir and agitate the tailings as they pass over the amalgamated surfaces and under the plate. When the tailings leave this trough, they pass through a sluice to the tailing-pile.

It will be noticed that the driving-pulley M, from which the power for rotating the barrels E and F is derived, is placed at the top instead of at the bottom of the frame-work, as in my former patent. This has been an important change, as it enables me to locate and place the iron tank G below the settling-barrel, which position was occupied by the driving mechanism in my former patent. By means of this tank I can more speedily discharge and work off the contents of the settling-barrel when necessary.

For operating the barrels, as described in my former patent, practical working has demonstrated that a simple frame-work, as there shown, is not sufficient and that it was necessary to add the side extensions formed by the horizontal timbers $p$ $p$ and upright timbers $q$ $q$, thus forming side extensions for supporting the tighteners for the driving-belts. This addition adds greatly to the efficiency of the machine.

The improvement in the amalgam-safe consists in giving to the lower portion or amalgam-receptacle a peculiar shape, which favors a free discharge and cleaning of the vessel. This being a very important, exact, and complete operation, a minute description is important. The bowl and safe are made together and are attached to a plate, which can easily be bolted to the wood-work. The best size of bowl is about sixteen inches long, six inches wide, and four inches deep in front for discharge, with back and side six inches deep. The safe attachment below can be made of any shape, square or rounded, but should bulge at the center and have a steep incline toward the bottom or discharge. The object of this steep incline is to prevent the amalgam from sticking to its side, and allows the amalgam to slide freely downward when cleaning up. These improvements I reserve for the subject of a future application.

The means for shaking the toothed plate V is shown in Fig. 13, Sheet 1, wherein a crank $w$ is shown as attached to the shaft of the belt-pulley. To this crank is connected one end of a pitman $w'$, the opposite end of said pitman connecting with an arm $w^2$, the latter having its lower end pivoted to the side of trough W and its upper end connected to the toothed plate. It is obvious that when the belt-pulley is rotated the toothed plate will be given a backward and forward movement through the medium of the crank, pitman, and connecting-arm.

By this improved apparatus and process, which is known as the "Paul dry amalgamating-barrel process," I can treat gold and silver ores with the greatest success. These improvements have been the result of practical investigation and render the apparatus complete in all respects.

I am aware that minor changes may be made in the arrangement of parts and details of construction without necessitating a departure from the nature and scope of my invention.

Having thus described my invention, what I claim as new, and desire to secure protection in by Letters Patent of the United States, is—

1. An organized apparatus for treating gold and silver ores by the dry process, consisting of the following parts in combination: a frame, a rotatable pulverizing-barrel mounted therein, a hopper beneath said barrel, a second frame provided with a hopper at its upper end, an inclined elevator for conveying the material from the lower to the upper hopper, rotatable amalgamating and settling barrels journaled in the second frame, a tank beneath the settling-barrel, having its bottom formed of two portions inclined toward the middle of the tank and toward the discharge end, also provided with a central gutter or trough, a trough extending from said tank, a receiving-bowl and amalgam-safe located at the opposite end of said trough, an elevator for conveying the overflow mercury to the upper hopper, a trough leading from the amalgam-safe, an amalgamating-trough located at the end of said second-named trough, provided with an inclined amalgamated bottom, said bottom inclined from opposite ends toward the center, where it is recessed transversely, a toothed shaking plate mounted above said recess, means for shaking said plate, a semicircular supplemental trough located at one end of the inclined amalgamating-trough, a cylindrical agitator provided with a series of radial pins, said agitator mounted to be rotated in said supplemental trough, and means for operating the elevator and rotating the several cylinders, substantially as set forth.

2. In an apparatus for treating gold and silver ores, the combination, with a trough provided with an inclined amalgamated bottom, said bottom inclined from opposite ends toward the center, where it is recessed transversely, of a toothed shaking plate mounted above said recess, means for agitating said plate, a semicircular supplemental trough located at one end of the inclined trough, and a cylindrical agitator provided with a series of radial pins, said agitator mounted to be rotated in said supplemental trough, substantially as set forth.

In witness whereof I have hereunto affixed my signature in the presence of two witnesses.

ALMARIN B. PAUL.

In presence of—
  N. A. ACKER,
  J. H. BLOOD.